July 17, 1962 R. S. THOMPSON 3,044,475
OIL FILTER CLEANER
Filed May 4, 1961

ROBERT S. THOMPSON
INVENTOR.

BY
Robert K. Rhea
AGENT

3,044,475
OIL FILTER CLEANER
Robert S. Thompson, Rte. 1, Comanche, Okla.
Filed May 4, 1961, Ser. No. 107,737
3 Claims. (Cl. 134—102)

The present invention relates to oil filters and more particularly to an apparatus for cleaning the same.

Automotive oil filters presently being used are normally discarded and replaced with a new filter at the end of a selected period of use. The filter and the material from which it is constructed is capable of a much longer life of service if the filter material can be cleaned of collected residue.

It is, therefore, the principal object of the instant invention to provide an apparatus for removing residue and impurities such as carbon, or the like, from the filtering material of oil filtering elements whereby the filter element may be repeatedly used.

Another object is to provide a pneumatic and liquid type filter cleaning apparatus for effectively loosening and removing substantially all of the residue and oil collected by the filter element.

Another object is to provide a device of this class which is easily and inexpensively operated.

Still another object is to provide a device of this class by which any standard type automotive oil filter may be cleaned or reconditioned.

The present invention accomplishes these and other objects by providing a head member removably connected by an adapter to the fluid inlet and outlet end of an oil filter by a mandrel threadedly secured to the filter. Flexible tubing, connected with ports provided in the head member, supplies air and a cleaning fluid, under greater than atmospheric pressure, for forcing cleaning fluid through the filter in a direction opposite to the flow of the fluid being cleaned by the filter.

Other objects will be apparent from the following description when taken in conjunction with the accompanying single sheet of drawings, wherein.

Like characters of reference designate like parts in those figures of the drawings in which they occur.

In the drawings.

Figure 1:
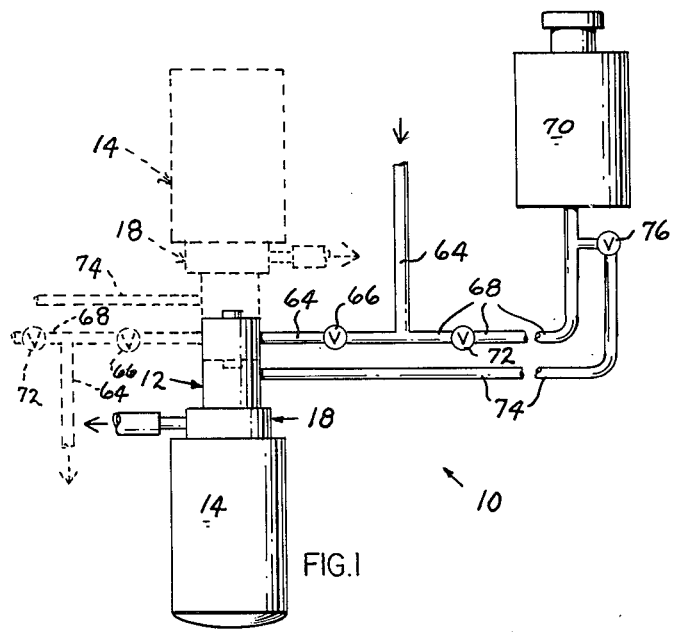
FIGURE 1 is an elevational view of the device illustrating, by dotted lines, an inverted draining position of the filter and the connecting head.
Figure 2:
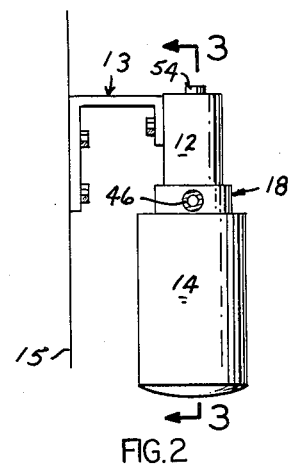
FIGURE 2 is a side elevational view illustrating the manner of mounting the filter connecting head.

The reference numeral 10 indicates the device as a whole. The device 10 includes a centrally bored head 12 which is connected to one end of a conventional tank-type oil filter 14 by a mandrel 16 through a hollow adapter 18 interposed between the head 12 and filter 14. The head 12 is preferably mounted by a bracket and bolts 13 on a supporting wall, indicated by the line 15, for pivoting movement of the head 12 and filter 14 between an upright and an inverted position, indicated by the dotted lines (FIG. 1).

The filter 14 is formed with an outer wall or jacket 20 and a foraminated inner wall 22. Filtering material 24 fills the spacing between the jacket 20 and the inner wall 22. One end 26 of the jacket is provided with a threaded central outlet opening 27 which threadedly receives the mandrel 16 intermediate the ends of the latter. Oil inlet apertures 28 surround the central outlet opening 27 and are normally closed by a resilient gasket 30. One end portion 32 of the mandrel 16 projects into the filter 14 and is provided with a plurality of ports or openings 34 in its wall for the purposes which will presently be apparent. The other end portion of the mandrel projects beyond the end 26 of the filter and is externally threaded, as at 36, for engagement with the bore of the head 12.

One end wall of the adapter 18 is provided with a central opening 37 closely received by the mandrel 16. An O ring type gasket 39 seals the adapter with the head 12. The other end wall of the adapter is provided with a relatively large opening 38 coaxial with the opening 37 which provides communication between the adapter fluid receiving chamber 40 and the inlet openings 28 surrounding the mandrel 16. The end surface of the adapter 18, opposite the head 12, seals fluid tight with the conventional gasket 42 on the filter. Pins 44, secured to the adapter around the opening 38, are freely received by the respective fluid inlet openings 28 of the filter and contact the gasket 30 to maintain the latter in spaced relation with respect to the inner surface of the filter end 26 for the purposes which will presently be apparent.

A tubular member 46 is closely received by an opening 48 formed in the wall of the adapter 18 to form a lateral filtered residue discharge port for the adapter.

One end portion of an elongated tubular nozzle 50 is threadedly connected, as at 52, with the bore of the head intermediate the ends of the latter. One end portion of the nozzle 50 is diametrically reduced with respect to its threaded end portion, and is freely received by and projects into the bore of the adjacent end portion of the mandrel 16. A cap or plug 54 is threadedly received by the end of the head opposite its connection with the adapter 18 forming a chamber 56 between the inward end of the cap 54 and the threaded end of the nozzle 50. The chamber 56 communicates with the bore of the mandrel 16 through a small aperture 58 formed in the depending end of the nozzle 50. The head 12 is provided with a pair of spaced lateral apertures or ports 60 and 62. The port 60 communicates with the chamber 56 while the port 62 is in communication with the bore of the head below the threads 52. Flexible tubing 64 is connected with the head port 60 and a supply of compressed air, not shown, through a valve 66. Other flexible tubing 68 is connected with the tubing 64 and a cleaning fluid reservoir 70 through a similar valve 72. Flexible by-pass tubing 74 is connected to the head port 62 and the flexible tubing 68 between the valve 72 and reservoir 70 through another valve 76.

Operation

In operation, the filter 14 is connected with the head 12 and adapter 18 as disclosed hereinabove. The valves 72 and 76 are closed and the valve 66 is opened to admit air under pressure into the chamber 56. The air passes through the nozzle 50 into the mandrel 16, out through the ports 34, through the foraminated wall 22, and forces oil trapped by the filter material 24 out through the filter openings 28, through the adapter discharge or outlet tube 46. This direction of flow is opposite to the normal filtering flow of fluid through the filter 14. After the majority of the oil contained by the filter is blown out, the valve 66 is closed and the valve 76 opened to admit cleaning fluid from the reservoir 70 to enter and fill the filter 14. The filter and head are pivoted to an inverted position, shown by dotted lines (FIG. 1) and the valve 76 is closed and the valve 66 reopened to blow the cleaning fluid out of the filter as previously described in removing the oil.

A jet action cleaning of the filter may be achieved by opening the valve 76 to admit cleaning fluid into the bore of the head while compressed air is passing through the filter from the nozzle 50.

Alternatively the valve 66 may be closed and the valve 72 opened to force the cleaning fluid from the reservoir through the opened valve 76 and tubing 74, through the filter wherein the compressed air and cleaning fluid forms a scrubbing action in removing residue contained by the filter material 24. This cleaning action removes substantially 95 percent of the filtered residue and impurities contained by the filter material 24.

Figure 4:
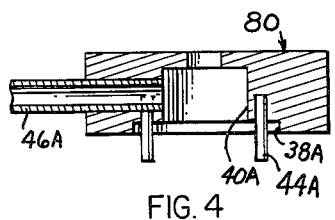
Figure 3:
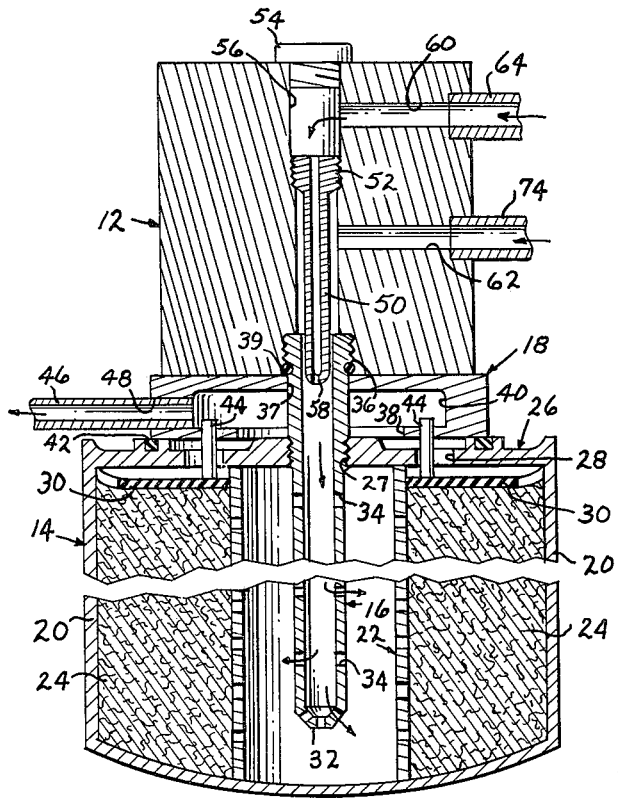
FIGURE 3 is a vertical cross-sectional view taken substantially along the line 3—3 of FIG. 2; and, FIGURE 4 is a cross-sectional view illustrating an alternate type of filter connecting adapter.

FIG. 4 illustrates one example of alternately formed adapters for connection with other conventional type oil filters wherein the alternate adapter 80 is provided with a tubular discharge member 46A, similar pins 44A and a central chamber 40A for co-operative engagement with a particular filter, not shown.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A cleaning apparatus for a filter element having an end wall provided with an inlet opening through which liquid to be filtered is received and an outlet opening through which the filtered liquid is discharged therefrom, comprising: an elongated hollow mandrel threadedly engaged, intermediate its ends, by the end wall forming the outlet opening in said filter; a centrally bored head threadedly connected to the end of said mandrel projecting outwardly of said filter, said head having a pair of lateral ports communicating with its bore; a nozzle threadedly engaged by one end portion with the wall forming the bore of said head between the lateral ports in the latter, said nozzle having one end portion projecting into the adjacent end portion of said mandrel; a cleaning fluid reservoir; an adapter interposed between said head and the adjacent end of said filter, said adapter having a lateral discharge port; and tubing connected with said port in said head for admitting air under pressure into said filter.

2. Structure as specified in claim 1 in which said filter tank is provided with a gasket normally seated against and closing the liquid inlet opening, and a pin secured to said adapter and projecting into the filter liquid inlet opening and contacting said gasket to unseat the latter and permit passage of filtered residue therethrough.

3. A cleaning apparatus for a filter tank having a threaded outlet through which filtered liquid is discharged therefrom and an inlet through which the liquid to be filtered is received thereinto, said filter tank having a gasket normally closing the inlet, comprising: an elongated hollow mandrel threadedly engaged intermediate its ends with the outlet of said filter tank, the end of said mandrel within said tank having a series of ports in its wall; a centrally bored head closed at one end and threadedly secured at its other end to the end portion of said mandrel projecting outwardly of said tank, said head having a pair of ports in its wall communicating with its bore; a tubular nozzle threadedly secured by one end portion with the wall forming the bore of said head between the pair of ports, the other end portion of said nozzle projecting into the bore of the adjacent end portion of said mandrel; a hollow adapter interposed between said head and said tank around the mandrel, said adapter having a discharge port through which filtered residue is flushed from the tank; at least one pin secured to said adapter, said pin being freely received within the inlet opening in said filter tank in contact with said gasket to move the latter and open the inlet opening and permit passage of filtered residue therethrough; a cleaning fluid reservoir; and tubing and valve means connecting said reservoir and the ports in said head with a supply of air under greater than atmospheric pressure.

References Cited in the file of this patent

UNITED STATES PATENTS

| | | |
|---|---|---|
| 1,639,170 | Fell | Aug. 16, 1927 |
| 1,647,799 | Hammer | Nov. 1, 1927 |
| 2,606,628 | Hasselwander | Aug. 12, 1952 |
| 2,811,975 | Tatibana | Nov. 5, 1957 |
| 2,919,704 | Butler | Jan. 5, 1960 |